April 18, 1939. Z. LITTMAN 2,154,463
SUPPORTING, EQUALIZING, AND STABILIZING MECHANISM
Original Filed June 22, 1935 6 Sheets-Sheet 4
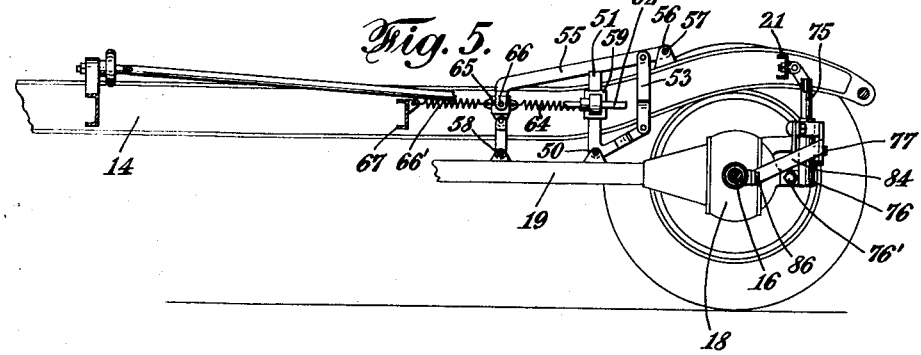
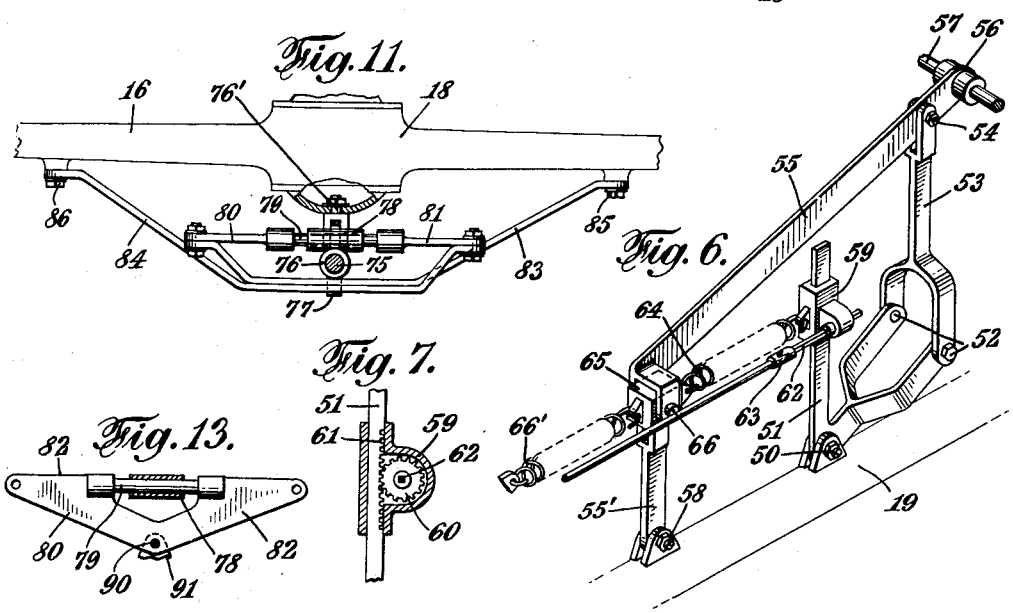
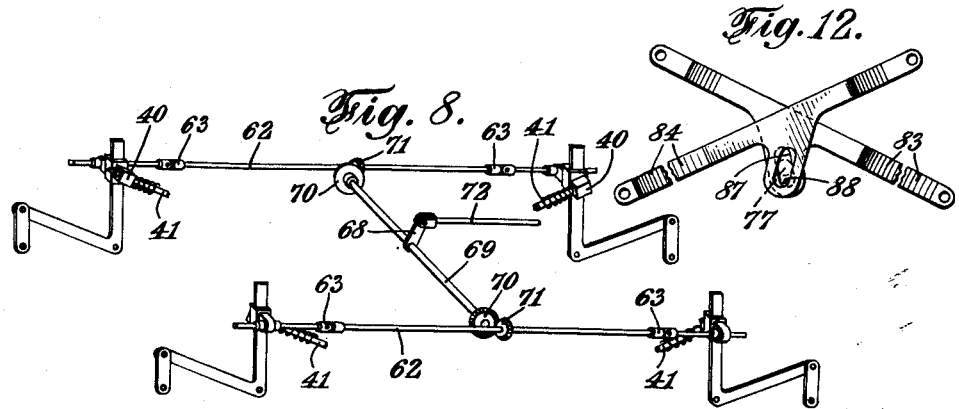
INVENTOR.
Zeno Littman.
BY
Ramsey, Kent, Chisholm & Lutz
ATTORNEYS

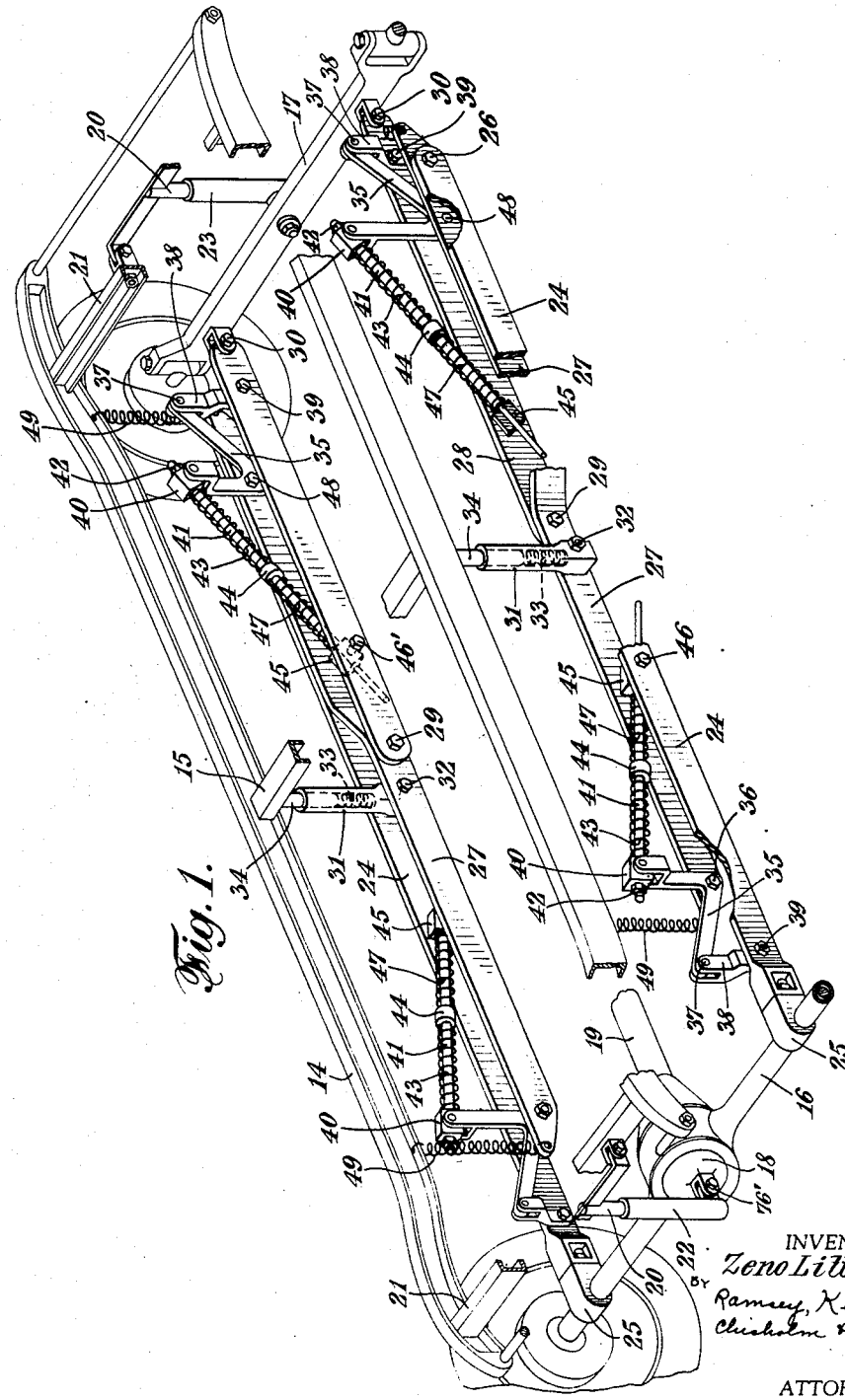

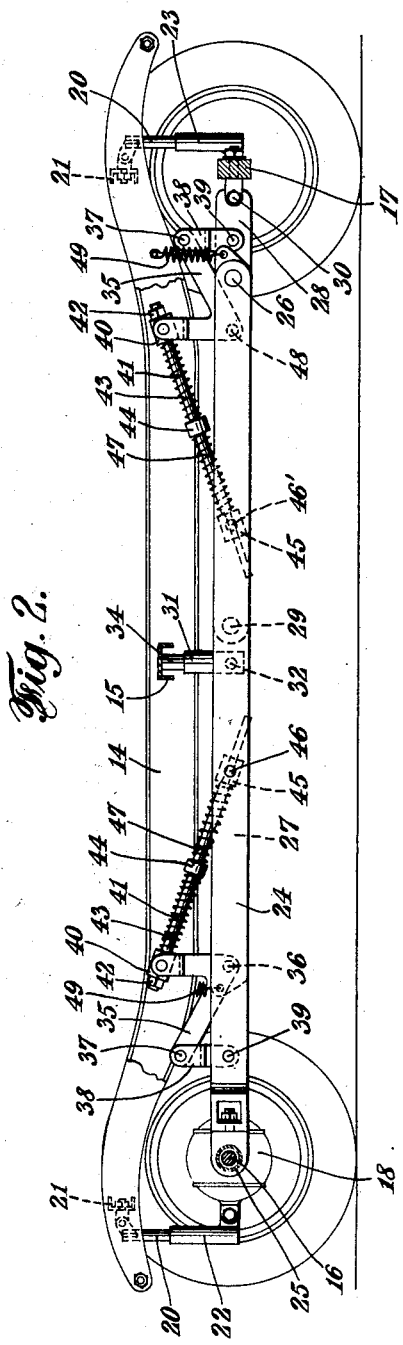
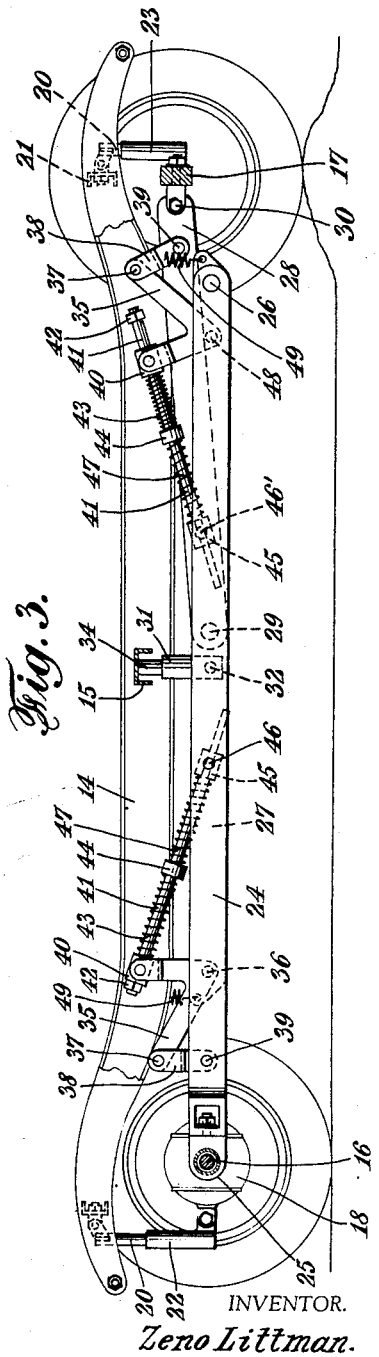

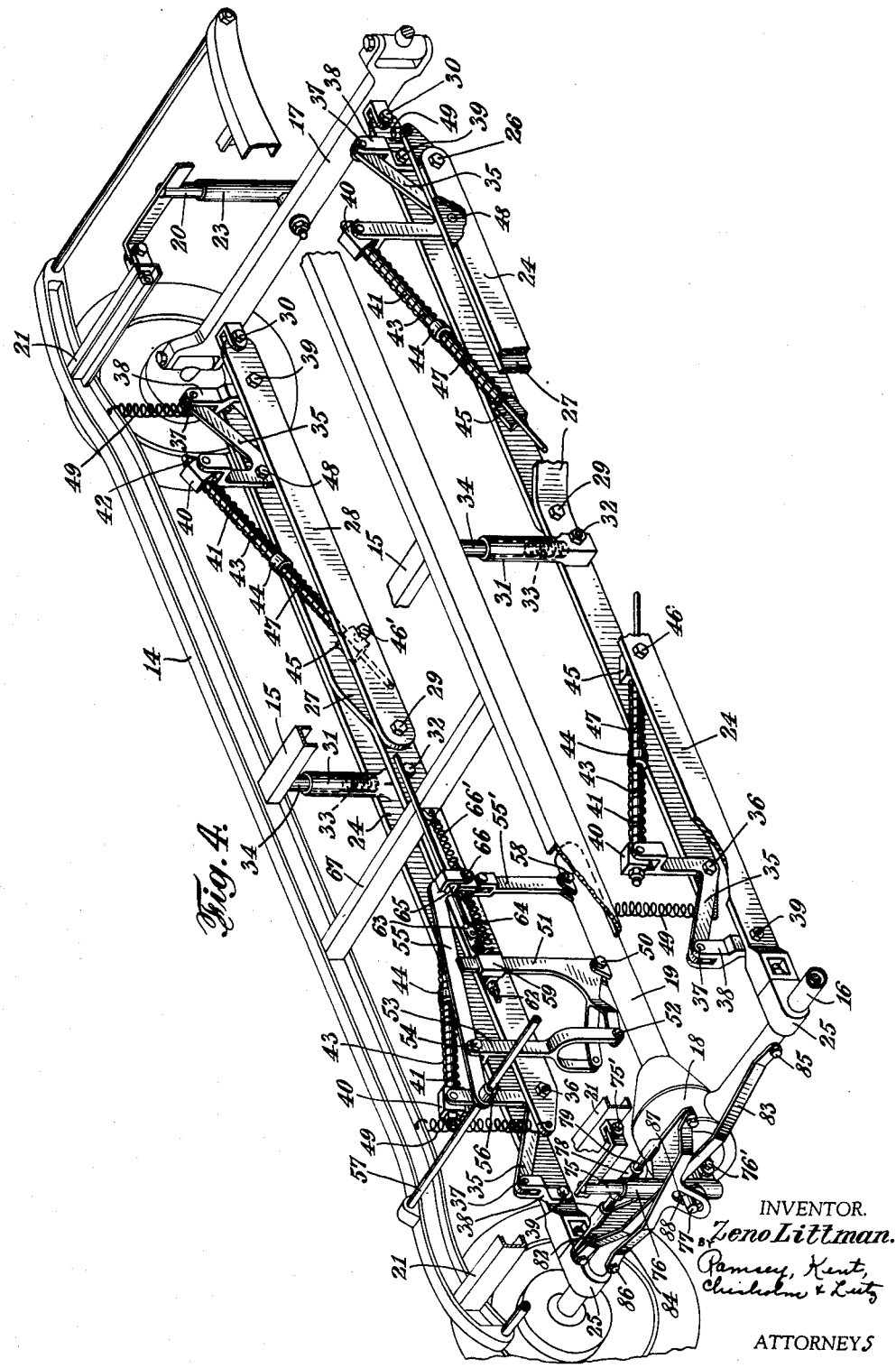

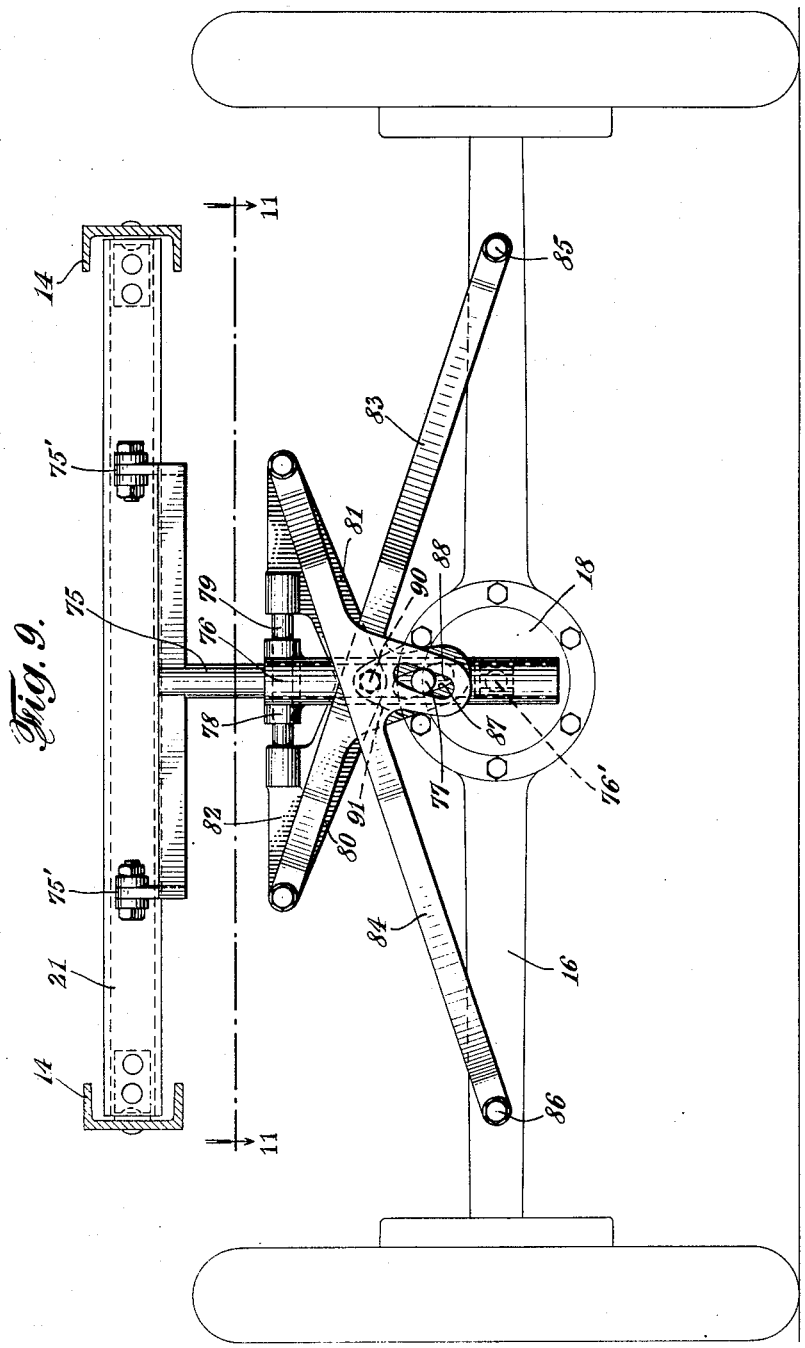

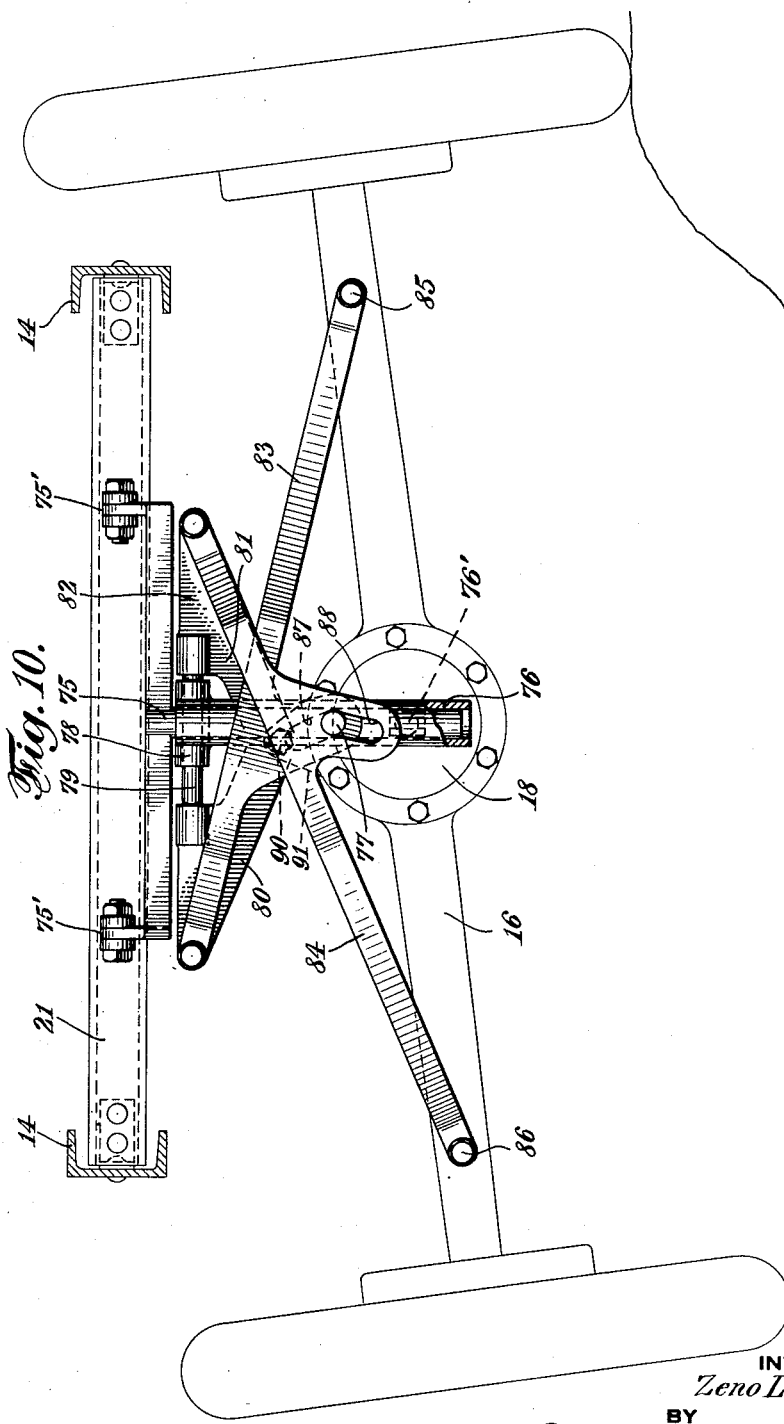

Patented Apr. 18, 1939

2,154,463

UNITED STATES PATENT OFFICE 2,154,463

SUPPORTING, EQUALIZING, AND STABILIZING MECHANISM

Zeno Littman, New York, N. Y.

Application June 22, 1935, Serial No. 27,855
Renewed April 17, 1937

14 Claims. (Cl. 280—104)

This invention relates to supporting and equalizing mechanism having in its broader aspect a great variety of practical applications, including the equalized and/or stabilized support of floating structures. I have illustrated the application of the invention to the support or suspension of a motor vehicle body or chassis frame. In this embodiment the principal features of the invention include:

The support of the frame upon the axles in such manner that the frame or body is practically stabilized against lateral or longitudinal tilting or pitching, and especially such tilting or pitching motions as are ordinarily caused by the rise of only one wheel at a time, due to road inequalities, and which cause the greatest discomfort to passengers. In addition to the equalizing means, I preferably provide stabilizing means which definitely controls or maintains the horizontal position of the chassis when only one wheel is displaced vertically. An additional objective is to provide for the regulation of the resistance values of certain of the springs which enter into the construction of my device, so that adjustment may be made in this respect in view of varying load conditions of the vehicle.

Other objects and advantages of the invention will be apparent from the following description when read in connection with the accompanying drawings, in which:

Fig. 1 is a view in perspective, with parts broken away, illustrating certain features of the invention as applied to the chassis frame of an automobile;

Fig. 2 is a side elevation illustrating the invention depicted in Fig. 1 and with the parts in the position they occupy under normal, that is to say, level road conditions;

Fig. 3 is a view similar to Fig. 2, but showing the position of certain parts when an obstacle in the road has been encountered;

Fig. 4 is a view similar to Fig. 1, but illustrating means, additional or alternative to what is shown in Fig. 1, for controlling certain relative movements between chassis frame and axles;

Fig. 5 is a sectional view with parts broken away, illustrating the spring adjusting means for certain of the mechanism illustrated in Fig. 4;

Fig. 6 is an enlarged detail of the spring adjusting mechanism shown in Figs. 4 and 5;

Fig. 7 is a sectional detail of part of the spring adjusting means shown in Fig. 6;

Fig. 8 is a more or less diagrammatic view illustrating means for simultaneously controlling certain of the springs illustrated in Figs. 1 and 2;

Fig. 9 is an end view of an automobile chassis and running gear such as shown, for example, in Fig. 4, with means for maintaining the chassis frame in desirable horizontal position despite road inequalities, the parts being in position they occupy under normal level road conditions;

Fig. 10 is a view similar to Fig. 9 but showing the position of parts when road conditions are abnormal as indicated;

Fig. 11 is a detail view, with some parts in section and some broken away, showing details of the stabilizing members illustrated in Figs. 9 and 10;

Fig. 12 is a detail of a part of the stabilizing mechanism illustrated in Figs. 9, 10 and 11, and Fig. 13 is a detail of still other parts of said stabilizing mechanism.

The particular advantages of various structural features of my invention will appear or be specifically referred to in the course of the following description of parts, operative relations, and combinations.

Referring first to the illustrations contained in Figs. 1 and 2, there is indicated at 14 a chassis frame upon which is to be carried the body of a vehicle, this frame comprising side pieces and end pieces, and such cross connection as may be desirable for purposes of rigidity, one such cross-piece being shown at 15, in the form of a channeled member. 16 indicates the rear axle and 17 the front axle of the vehicle, while 18 indicates the differential housing and 19 the housing for the transmission shaft, which of course is operatively connected to the engine (not shown) and to the differential contained within the differential housing 18.

The chassis frame is supported at each end by means of vertical plungers 20 connected to end cross-pieces 21 of the chassis, which plungers 20 work in cylinders 22 and 23 at the rear and forward ends of the vehicle respectively, both cylinders being pivoted, to the differential housing and to the front axle, respectively, substantially midway of the width of the vehicle, and so that each cylinder can move in a vertical plane parallel to the longitudinal axis of the vehicle and also in a vertical plane transverse to said axis.

Extending between the front and rear axles at each side of the longitudinal center line of the vehicle is what I may call a torque rod 24 pivoted to the rear axle as indicated at 25, and at its forward end pivotally connected as at 26 to and near the forward end of a sub-chassis frame-piece 27 which may be in the form of a rod disposed in general parallelism to the torque member 24. There is a second torque member 28 which has one end pivoted to and somewhere along the lengh of the sub-chassis frame member 27 as indicated at 29, and its other or forward end pivotally connected as at 30 to the forward axle 17. As appears in the drawings, Figs. 1 and 4, there is a sub-chassis frame-piece 27, with associated torque members 24 and 28 at each side of the vehicle; and about midway of the length of each sub-chassis frame-piece 27 and of the vehicle there is a cylinder 31, pivoted at its lower end as indicated at 32 to the sub-chassis frame member 27, so that the cylinder is movable in a vertical plane parallel to the vehicle axis. Within each cylinder there is a compression spring indicated by dotted lines at 33, upon which rests one end of the plunger 34, the other end of which projects from the cylinder and is preferably fast within the confronting channel of cross member 15.

35 indicates a bell crank lever pivoted at the rear end of sub-chassis frame-piece 27, as indicated at 36, one arm of the bell crank having pivotal connection as at 37 with a link 38, the other end of said link 38 being pivoted at 39 to the outer torque rod 24. The other arm of the bell crank lever is forked as shown, and in this form is swiveled a block 40 through which a rod 41 is slidable. The end of the rod at one side of the block 40 carries a nut 42, which provides an adjustable stop for the sliding movement of the rod in one direction relatively to the block 40. On the other side of the block there is a coil spring 43, surrounding the rod 41 and adapted to be compressed between the block 40 and a collar 44 rigid with or formed on the rod 41 intermediate the ends of the latter. The other end of the rod 41 is reduced and this reduced portion extends through a slide block 45 which is pivoted in the torque member 24, as at 46, and there is another coil spring 47 operative between collar 44 and slide block 45. The reduced end of the rod 41 as stated, slides relatively through the block 45, but the shoulder between its unreduced portion and its reduced portion acts as a stop against the block 45, as will be apparent from an inspection of Fig. 1.

There is a similar arrangement of bell crank lever, springs, etc. for the forward end of the sub-chassis frame, that is to say, there is a bell crank lever 35 pivoted at 48 near the forward end of the sub-chassis frame-piece 27, the arm 35 of the bell crank having pivotal connection at 37 with a link 38 that is pivoted at 39 to the inner torque member 28; the other arm of the bell crank being connected, by a rod-and-spring combination similar to that already described, to inner torque member 28, the block 45 of this combination being pivoted at 46' to the inner torque member 28. I have described the arrangement of parts at one side of the chassis frame and it will be understood that there is a similar arrangement on the other side, as clearly enough shown in Fig. 1. The opposite ends of the two sub-chassis frame-pieces 27 may advantageously be connected to corresponding points above them of the chassis frame 14 by means of expansion coil springs 49. Assuming that the two springs 33 have each of them a resistance to compression of say 2000 lbs., that the springs 47 have a resistance to expansion of say 1000 lbs. each, and that the springs 43 have each of them a resistance to compression of say 1200 lbs., it will be obvious that in the event of a road-happening such as that indicated in Fig. 3, the result will be to raise the forward end of the torque member 28, this resulting in movement of the adjacent bell crank on its pivot 48 to the position shown in Fig. 3, resulting in the possible compression of spring 43 to an extent reflecting the size of the road inequality and the shock thereby generated. After the abnormal road condition has passed, the bell crank returns to the Fig. 2 position and may move beyond that position, against the resistance to expansion of spring 47. Analogous results are seen when a rear wheel meets a road construction, as will be obvious. Incidental absorption of direct and rebound shocks is avoided by the several springs 33 and 49, which may have resistance to expansion of, say, 2000 lbs. each in the case of the springs 33 and of say 1500 lbs. each in the case of the springs 49.

One advantageous feature of the bell crank-and-spring devices is in the fact that the resistance values of the several springs may be controlled either individually or simultaneously to meet varying load conditions of the vehicle to which they are applied. This may be accomplished by providing for variation of the effective length of either arm of bell-crank 35, as, for example, by arranging that the slide blocks 40 shall be movable to different positions along the length of the arms of the bell cranks on which they are carried, as will be hereinafter described.

As an addition to or in substitution for the spring supports 31, I may provide at one or both ends of the vehicle a construction such as is illustrated in Fig. 4, shown in greater detail in Figs. 6 and 7. Referring to these figures, there is shown adjacent the rear end of the vehicle, pivoted for vertical movement on and in the plane of the transmission shaft housing 19, as at 50, a bell crank lever, one arm 51 of which extends upwardly in the plane of the housing 19, and the other end of which extends horizontally and is forked. Pivoted to the forks as at 52 is the correspondingly forked lower end of a link 53, whose upper end is pivoted at 54 to a rod 55, one end of which is pivoted at 56 to a cross-rod 57 of the chassis frame 14, the other end of the rod 55 being pivoted at 66 to the upper end of a link 55' which extends downwardly to a pivotal connection 58 with the transmission shaft housing 19. The upper end 51 of the first named bell crank lever has on it a slide block 59 which carries interiorly thereof a pinion 60 that meshes with a rack 61 formed on the bell crank arm 51, the pinion 60 being mounted on a shaft 62 that extends to some convenient place in the vehicle within reach of the operator, so that upon rotation of this shaft 62 the slide block 59 may be moved upwardly or downwardly on the bell crank arm 51, the operating rod 62 including a swivel joint 63 to permit of slight angular variations of the relation between the operating rod and the slide block due to changes of relative position of the block. There is an expansion coil spring 64 operative between the slide block 59 and another block 65 pivoted at the forward end of the lever arm 55 as at 66, and the other end of this block 65 is connected by an expansion spring 66' to a cross piece 67 of the chassis frame. The result of the foregoing described arrangement is to control adventitiously produced tendency of movement as between the transmission shaft housing and the chassis frame, as will be obvious, and to make it possible to adjust the resistance value of spring 64 as may be desirable. Such an arrangement may be disposed at both ends of the vehicle and controlled as to resistance values by the operator in the manner shown. A similar method for controlling the values of the springs 43 is indicated in Fig. 8, where there is a control rod 72 connected by a link connection 68 to a cross-rod 69 that carries at each end a mitre gear 70 that meshes with a corresponding gear 71 mounted on shaft 62, each shaft 62 at each end thereof passing through a slide block 40 which is to be raised or lowered on its bell crank arm in a manner already described with reference to the slide block 59 of Fig. 6 and with comparable results as to the control of the resistance values of springs 43. And the control rod 72 for the several springs 43 may be the one shown in Fig. 6 and previously described, so that adjustment of the resistance values of all the springs 43 and 64 may be accomplished simultaneously.

The special stabilizing function heretofore referred to depends upon structure illustrated in Figs. 9–13 inclusive, and comprises an addition to what is shown in Figs. 1, 2 and 3. At the rear of the chassis frame there is a vertically depending plunger 75, pivoted at 75' to the chassis, so that it may swing only in a vertical plane parallel to the vehicle axis and towards and away from the chassis, this plunger working in a cylinder 76 pivoted to the center of the rear axle by a universal joint 76', and normally carried in vertical position on the differential housing 18, the cylinder having exteriorly at the rear thereof a projecting pin 77. On the other side of the cylinder there is an integral or rigidly secured sleeve or bearing member 78, horizontally disposed, within which is slidable a rod 79, carried between the arms 80—81 of a yoke piece 82, the inner ends of the arms adapted to contact with the ends of the bearing member 78 whereby relative sliding movement between rod 79 and bearing 78 is limited in both directions; and the lower intermediate portion of the yoke piece 80 is pivotally connected at 90 to a piece 91 that is rigidly connected to and extends upwardly from the axle 16 in the line of the cylinder 76. Pivotally connected to the ends of the arms 80—81 are the upper ends of connectors 83, 84, connector 83 having its lower end pivoted near one end of axle 16, as at 85, and connector 84 having its lower end pivoted near the other end of the axle, as at 86. Intermediate their ends the connectors are provided with oppositely inclined slots 87—88, and pin 77 extends through both of them. The result of this construction, as will be evident upon comparison of Figs. 9 and 10, is that within limits the chassis will be automatically maintained in horizontal position despite road inequalities that would otherwise raise or lower one side or the other out of the horizontal.

From the foregoing description it will be seen that I have provided a construction in which the chassis frame is supported with capacity for vertical movement relatively to the axles at two opposite points located respectively midway of the length of the axles, and at two opposite points located substantially midway of the distance between the axles. Furthermore, the chassis is supported in vertically spaced relation to subchassis frame-pieces that extend longitudinally beneath it, the sub-chassis frame-pieces having yielding connection with the axles by means of spring mechanisms and torque rods, in such manner that movement of an axle relatively to the sub-chassis frame-pieces does not substantially disturb the normal relation between the chassis and the sub-chassis frame-pieces. Withal there is provision for control of operative spring values, ample provision to absorb shocks, direct and rebound, and simple means for maintaining the chassis in its normal horizontal plane despite varying road conditions and without loss of other functions or advantages referred to, in that the relation between chassis and subchassis framepieces remains substantially constant.

I have illustrated and described my invention as applied to a vehicle, such as an automobile. But as previously suggested, I contemplate a use for it in connection with other structures. For example, the underlying principle may be utilized in connection with a floating structure such as a landing platform for airplanes, which is to be anchored or travel in the water. In such an embodiment the landing platform would be the equivalent of the chassis, the usual buoys or floats, preferably united in a frame structure, would replace the wheels and axles of the vehicle, and equalizing and stabilizing means like those herein described will connect the platform and the buoys, as and for the same general purposes and for obtaining the same general results herein set forth.

I claim:

1. In a vehicle structure having front and rear axles, a chassis having sides and ends and located in spaced relation above the axles, vertical connecting members extending from midway of the length of the respective axles to points midway of the width of the chassis, respectively, the connecting members being pivoted to one of the parts connected thereby so that they may move relatively in vertical planes transversely of and parallel to the longitudinal axis of the vehicle, parallel sub-chassis bars at each side of the vehicle, vertical connectors extending from midway of the length of the chassis to and pivoted at points respectively midway of the length of the sub-chassis bars, and a connection, including a spring, between each end of each sub-chassis bar and the axle adjacent thereto.

2. The combination of claim 1, in which the vertical connecting members between the chassis and the axles are telescoping.

3. The combination of claim 1, in which the connections between the sub-chassis bars and the axles include torque rods, one on each side of each bar, each rod being pivoted at one end to an axle adjacent one end of a sub-chassis bar, and pivoted at its other end to the sub-chassis bar.

4. The combination of claim 1, in which the connections between the sub-chassis bars and the axles include torque rods, one on each side of each bar, each rod being pivoted at one end to an axle adjacent one end of a sub-chassis bar, and pivoted at its other end to the sub-chassis bar, and in which said springs are operatively related both to their associated sub-chassis bars and to a related torque rod.

5. The combination of claim 1, in which the vertical connectors between the sides of the chassis and the sub-chassis bars are telescopically yielding.

6. The combination of claim 1, in which the resistance values of the springs are adjustable.

7. The combination of claim 1, in which each end of each sub-chassis bar is connected to the chassis by an expansion spring.

8. The combination of claim 1, in which there is a parallel motion connection between the rear axle and the chassis.

9. In a vehicle structure having front and rear axles, a chassis having sides and ends and located in spaced relation above the axles, vertical connecting members extending from midway of the length of the respective axles to points midway of the width of the chassis, respectively, the connecting members being pivoted to one of the parts connected thereby so that they may move relatively in vertical planes transversely of and parallel to the longitudinal axis of the vehicle, a sub-chassis structure suspended in normally constant spaced relation to and below the chassis, torque members pivoted at one end thereof respectively to the sub-chassis and having their other ends respectively pivoted to an adjacent axle, and spring means operative between the sub-chassis and associated torque members opposing movement of the torque members, said spring means being constructed and arranged to exert force primarily and preponderantly in the direction of the length of the respective torque members.

10. In a vehicle structure having front and rear axles, a chassis having sides and ends and located in spaced relation above the axles, by vertical connecting members extending from midway of the length of the respective axles to points midway of the width of the chassis, respectively, the connecting members being pivoted to one of the parts connected thereby so that they may move relatively in vertical planes transversely of and parallel to the longitudinal axis of the vehicle, parallel sub-chassis bars at each side of the vehicle, vertical connectors extending from midway of the length of the chassis to and pivoted at points respectively midway of the length of the sub-chassis bars, and a connection, including a spring, between each end of each sub-chassis bar and the axle adjacent thereto, said connections between the sub-chassis bars and the axles including torque rods, one on each side of each bar, each rod being pivoted at one end to an axle adjacent one end of a sub-chassis bar, and pivoted at its other end to the sub-chassis bar, and said springs being operative to resist pivotal movement of the rods relatively to the bars in all directions.

11. In a vehicle structure having front and rear axles, a chassis having sides and ends and located in spaced relation above the axles, by vertical connecting members extending from midway of the length of the respective axles to points midway of the width of the chassis, respectively, the connecting members being pivoted to one of the parts connected thereby so that they may move relatively in vertical planes transversely of and parallel to the longitudinal axis of the vehicle, parallel sub-chassis bars at each side of the vehicle, vertical connectors extending from midway of the length of the chassis to and pivoted at points respectively midway of the length of the sub-chassis bars, and a connection, including a spring, between each end of each sub-chassis bar and the axle adjacent thereto, said connections between the sub-chassis bars and the axles including torque rods, one on each side of each bar, each rod being pivoted at one end to an axle adjacent one end of a sub-chassis bar, and pivoted at its other end to the sub-chassis bar, each sub-chassis bar having pivoted thereon a bell-crank, one arm of which carries a pivoted slide block with a rod passing through the block, the other end of the rod passing through a second slide block pivoted to a torque rod, a collar on the slide rod, and two springs operative between the collar and the slide blocks substantially as and for the purposes set forth.

12. In a vehicle structure having front and rear axles, a chassis having sides and ends and located in spaced relation above the axles, by vertical connecting members extending from midway of the length of the respective axles to points midway of the width of the chassis, respectively, the connecting members being pivoted to one of the parts connected thereby so that they may move relatively in vertical planes transversely of and parallel to the longitudinal axis of the vehicle, parallel sub-chassis bars at each side of the vehicle, vertical connectors extending from midway of the length of the chassis to and pivoted at points respectively midway of the length of the sub-chassis bars, and a connection, including a spring, between each end of each sub-chassis bar and the axle adjacent thereto, said connections between the sub-chassis bars and the axles including torque rods, one on each side of each bar, each rod being pivoted at one end to an axle adjacent one end of a sub-chassis bar, and pivoted at its other end to the sub-chassis bar, each sub-chassis bar having pivoted thereon a bell-crank, one arm of which carries a pivoted slide block with a rod passing through the block, the other end of the rod passing through a second slide block pivoted to a torque rod, a collar on the slide rod, two springs operative between the collar and the slide blocks substantially as and for the purposes set forth, and a common means for adjusting the resistance values of the several springs associated with the several slide rods.

13. In a vehicle structure having front and rear axles, a chassis having sides and ends and located in spaced relation above the axles, vertical connecting members extending from midway of the length of the respective axles to points midway of the width of the chassis, respectively, the connecting members being pivoted to one of the parts connected thereby so that they may move relatively in vertical planes transversely of and parallel to the longitudinal axis of the vehicle, parallel sub-chassis bars at each side of the vehicle, vertical connectors extending from midway of the length of the chassis to and pivoted at points respectively midway of the length of the sub-chassis bars, a connection, including a spring, between each end of each sub-chassis bar and the axle adjacent thereto, and common means for adjusting the resistance values of the springs.

14. In a vehicle having front and rear axles, a chassis for said vehicle, sub-chassis bars extending longitudinally of said vehicle and resiliently linked to the respective ends of said axles, sliding connections between said chassis and said bars, and resilient connections between said chassis and the respective ends of said bars.

ZENO LITTMAN.